US012676481B2

(12) United States Patent
Churnock

(10) Patent No.: US 12,676,481 B2
(45) Date of Patent: Jul. 7, 2026

(54) DISAGGREGATED SOLID STATE POWER DISTRIBUTION SYSTEM

(71) Applicant: Microsoft Technology Licensing, LLC, Redmond, WA (US)

(72) Inventor: Paul Andrew Churnock, O'Fallon, IL (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/418,163

(22) Filed: Jan. 19, 2024

(65) Prior Publication Data

US 2025/0239852 A1 Jul. 24, 2025

(51) Int. Cl.
*H02J 3/0073* (2026.01)
*H02J 3/28* (2006.01)

(52) U.S. Cl.
CPC .............. *H02J 3/0073* (2020.01); *H02J 3/28* (2013.01)

(58) Field of Classification Search
CPC .................................. H02J 3/0073; H02J 3/28
USPC .......................................................... 307/17
See application file for complete search history.

(56) References Cited

U.S. PATENT DOCUMENTS

| | | | | |
|---|---|---|---|---|
| 11,824,380 B2 * | 11/2023 | Xu | ...................... | H02M 3/1582 |
| 2022/0416684 A1 * | 12/2022 | Awal | ..................... | H02M 7/219 |

| | | | | |
|---|---|---|---|---|
| 2023/0396063 A1 * | 12/2023 | Zhang | ................... | H02M 5/458 |
| 2024/0223094 A1 * | 7/2024 | Li | ...................... | H02M 3/33576 |
| 2024/0237311 A1 * | 7/2024 | Li | ...................... | H05K 7/20272 |
| 2024/0391345 A1 * | 11/2024 | Lee | ......................... | B60L 53/14 |

FOREIGN PATENT DOCUMENTS

| | | |
|---|---|---|
| EP | 4033629 A1 | 7/2022 |

OTHER PUBLICATIONS

U.S. Appl. No. 18/493,669, 45 pages.
Chen, et al., "Data Center Power Supply Systems: From Grid Edge to Point-of-Load", IEEE Journal of Emerging and Selected Topics in Power Electronics, vol. 11, No. 3, Dec. 13, 2022, pp. 2441-2456.
Extended European search report received in European Application No. 25152364.3, mailed on Jun. 12, 2025, 10 pages.

* cited by examiner

*Primary Examiner* — Richard Tan
(74) *Attorney, Agent, or Firm* — Wade IP Law PLLC

(57) ABSTRACT

Techniques are described herein for distributing power using a disaggregated solid state power distribution system. The disaggregated solid state power distribution system includes an alternating-current-to-direct-current (AC-to-DC) converter and a solid state direct-current (DC) transformer. The AC-to-DC converter converts an alternating-current (AC) voltage, which is included in an incoming AC power signal having a power of at least one megawatt from an electrical source, to an intermediate DC voltage. The AC voltage is greater than or equal to 1000 volts root-mean-square (RMS). The intermediate DC voltage is greater than or equal to 1000 volts. The solid state DC transformer provides a DC power signal to information technology (IT) hardware by transforming the intermediate DC voltage to a transformed DC voltage that is included in the DC power signal. The transformed DC voltage is less than 1000 volts.

20 Claims, 9 Drawing Sheets

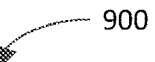

900

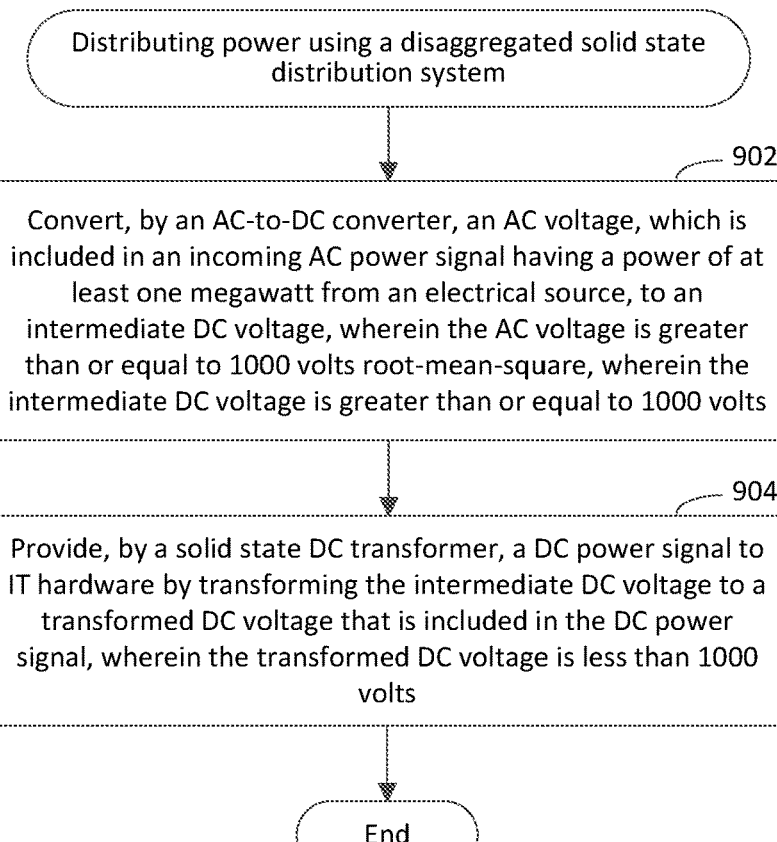

Distributing power using a disaggregated solid state distribution system

902

Convert, by an AC-to-DC converter, an AC voltage, which is included in an incoming AC power signal having a power of at least one megawatt from an electrical source, to an intermediate DC voltage, wherein the AC voltage is greater than or equal to 1000 volts root-mean-square, wherein the intermediate DC voltage is greater than or equal to 1000 volts

904

Provide, by a solid state DC transformer, a DC power signal to IT hardware by transforming the intermediate DC voltage to a transformed DC voltage that is included in the DC power signal, wherein the transformed DC voltage is less than 1000 volts End

FIG. 9

DISAGGREGATED SOLID STATE POWER DISTRIBUTION SYSTEM

BACKGROUND

Conventional power distribution systems include alternating-current (AC) components to distribute power from an electrical utility to a load. For instance, the power distribution systems traditionally provide AC power to DC power supplies that are included in the load. The AC components traditionally include a medium-voltage-to-low-voltage (MV:LV) transformer, a low-voltage (LV) uninterruptible power supply (UPS), and a low-voltage-to-low-voltage (LV:LV) transformer coupled in series between the electrical utility and the load.

Conventional power distribution systems face a variety of challenges. For example, cabling that has a relatively high cross-sectional area traditionally is used to transfer power from the LV UPS to the LV:LV transformer to handle the relatively high current that results from the low voltage at which the power is transferred. The cabling often is cumbersome and expensive and can limit an amount of power that the power distribution system is capable of delivering to the load. Due to the relatively high cross-sectional area of the cabling, a physical separation between the LV UPS and the LV:LV transformer may be limited to a relatively short distance. The aforementioned AC components of the power distribution system typically are housed in an electrical building that is located between the electrical utility and a facility that includes the load. The electrical building often has a relatively large footprint (e.g., a couple of thousand square feet).

One example environment in which a power distribution system may be utilized is a data center environment. In the data center environment, the power distribution system distributes power to information technology (IT) hardware that is housed in a data center. Some data centers incorporate artificial intelligence (AI) functionality, which often consumes more power than non-AI functionality. The increased power consumption of AI-enabled data centers may exacerbate the challenges faced by conventional power distribution systems.

SUMMARY

It may be desirable to disaggregate components of a power distribution system and/or to use direct-current (DC) component(s) in addition to or in lieu of AC component(s), for example, to increase energy density of the power distribution system and/or to reduce a cross-sectional area of cabling that connects the components. By disaggregating the components, a substantial proportion of the power distribution may be performed at a medium DC voltage with initial power conversion performed at a distance from a load and the final conversion performed near the load. A medium DC voltage is a DC voltage that is greater than or equal to 1000 volts and less than or equal to 30,000 volts. In the data center environment, disaggregating the components may enable the initial power conversion to be performed outside the IT space and the final conversion to be performed near an IT rack or row in the data center. Performing a substantial proportion of the power distribution at a medium DC voltage may result in a reduced cross-sectional area and a reduced cost of the cabling in the power distribution system, increased overall power density of the power distribution system, and/or a reduced footprint of the power distribution system. By using DC component(s) in the power distribution system, redundant components, energy storage, and long duration power generation may be added to the same path, rather than alternate paths, between an electrical source (e.g., an electrical utility) and the load. Using disaggregation and DC component(s) in the power distribution system may enable a higher density IT hardware installation while avoiding congestion of cabling.

Various approaches are described herein for, among other things, distributing power using a disaggregated solid state power distribution system. A disaggregated solid state power distribution system is a solid state power distribution system in which not all components of the power distribution system are included in the same building. A solid state power distribution system is a power distribution system that includes a solid state device. A solid state device is a device that functions by exploiting one or more electrical properties of a semiconductor material. For instance, the solid state device may be fabricated on a substrate of the semiconductor material.

In a first example approach, a disaggregated solid state power distribution system includes an alternating-current-to-direct-current (AC-to-DC) converter and a solid state direct-current (DC) transformer. The AC-to-DC converter converts an alternating-current (AC) voltage, which is included in an incoming AC power signal having a power of at least one megawatt from an electrical source, to an intermediate DC voltage. The AC voltage is greater than or equal to 1000 volts root-mean-square (RMS). The intermediate DC voltage is greater than or equal to 1000 volts. The solid state DC transformer provides a DC power signal to information technology (IT) hardware by transforming the intermediate DC voltage to a transformed DC voltage that is included in the DC power signal. The transformed DC voltage is less than 1000 volts.

In a second example approach, an AC voltage, which is included in an incoming AC power signal having a power of at least one megawatt from an electrical source, is converted to an intermediate DC voltage. The AC voltage is greater than or equal to 1000 volts RMS. The intermediate DC voltage is greater than or equal to 1000 volts. A DC power signal is provided to IT hardware by transforming the intermediate DC voltage to a transformed DC voltage that is included in the DC power signal. The transformed DC voltage is less than 1000 volts.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 9 depicts a flowchart of an example method for distributing power using a disaggregated solid state power distribution system in accordance with an embodiment.

Figure 1:
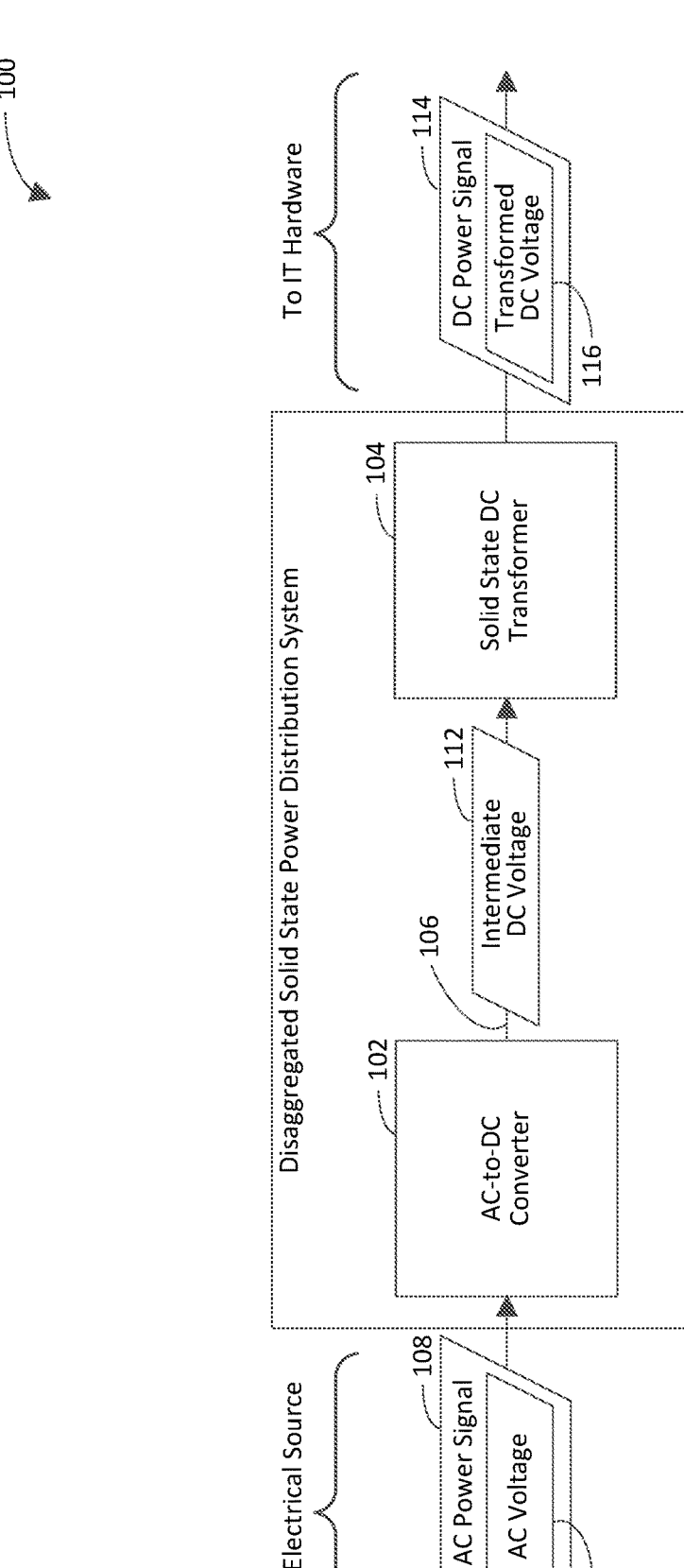
FIG. 1 is a block diagram of an example disaggregated solid state power distribution system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Example Embodiments

It may be desirable to disaggregate components of a power distribution system and/or to use direct-current (DC) component(s) in addition to or in lieu of AC component(s), for example, to increase energy density of the power distribution system and/or to reduce a cross-sectional area of cabling that connects the components. By disaggregating the components, a substantial proportion of the power distribution may be performed at a medium DC voltage with initial power conversion performed at a distance from a load and the final conversion performed near the load. A medium DC voltage is a DC voltage that is greater than or equal to 1000 volts and less than or equal to 30,000 volts. In the data center environment, disaggregating the components may enable the initial power conversion to be performed outside the IT space and the final conversion to be performed near the IT rack or row in the data center. Performing a substantial proportion of the power distribution at a medium DC voltage may result in reduced cross-sectional area and cost of the cabling in the power distribution system, increased overall power density of the power distribution system, and/or a reduced footprint of the power distribution system. By using DC component(s) in the power distribution system, redundant components, energy storage, and long duration power generation may be added to a common path, rather than alternate paths, between an electrical source (e.g., an electrical utility) and the load. Using disaggregation and DC component(s) in the power distribution system may enable a higher density IT hardware installation while avoiding congestion of cabling.

Example embodiments described herein are capable of distributing power using a disaggregated solid state power distribution system. A disaggregated solid state power distribution system is a solid state power distribution system in which not all components of the power distribution system are included in the same building. A solid state power distribution system is a power distribution system that includes a solid state device. A solid state device is a device that functions by exploiting one or more electrical properties of a semiconductor material. For instance, the solid state device may be fabricated on a substrate of the semiconductor material.

Example techniques described herein have a variety of benefits as compared to conventional power distribution techniques. For instance, the example techniques are capable of increasing an amount of voltage that is used to transfer power between components of the power distribution system, as compared to the conventional power distribution techniques, which reduces an amount of current that is used to transfer the power. By reducing the amount of current, the example techniques are capable of reducing a cross-sectional area of cabling between components of the power distribution system. By reducing the cross-sectional area of the cabling, the example techniques may reduce a cost of the cabling (and more broadly, the cost of the power distribution system) and increase an amount of power that the power distribution system is capable of delivering to a load (e.g., IT hardware).

Reducing the cross-sectional area of the cabling between the components of the power distribution system may enable the components to be disaggregated. For instance, the power distribution system may include an AC-to-DC converter and a solid state DC transformer. In a data center example, the AC-to-DC converter may be placed relatively far from a building that includes IT hardware, and the solid state DC transformer may be placed relatively close to (or inside) the building. In accordance with this example, the AC-to-DC converter may be placed at an outer boundary of a real estate lot on which the building is located. Accordingly, the AC-to-DC converter and the solid state DC transformer need not necessarily be housed together in an electrical building between an electrical utility and the building that includes IT hardware.

By disaggregating the AC-to-DC converter and the solid state DC transformer in the power distribution system and using a medium DC voltage to transfer power from the AC-to-DC converter to the solid state DC transformer, the power distribution system may distribute the power to the IT hardware more efficiently and at a lower cost. The example techniques are capable of incorporating functionality of power supplies that traditionally are included in IT hardware into the AC-to-DC converter and/or the solid state DC transformer. Accordingly, the example techniques may eliminate a need for such power supplies in the IT hardware, which may enable the IT hardware to consume less space and/or to include additional component(s) without consuming more space than the IT hardware would have consumed if the power supplies had not been eliminated.

FIG. 1 is a block diagram of an example disaggregated solid state power distribution system 100 in accordance with an embodiment. The disaggregated solid state power distribution system 100 includes an alternating-current-to-direct-current (AC-to-DC) converter 102 and a solid state direct-current (DC) transformer 104. An AC-to-DC converter (a.k.a. rectifier) is an electronic device that converts an alternating-current (AC) signal to a DC signal. Conversion of the AC signal to the DC signal is referred to as rectification. A DC transformer (a.k.a. a DC-to-DC converter) is an electronic device or an electromechanical device that converts an input signal having a first DC voltage to an output signal having a second DC voltage that is different from the first DC voltage.

The AC-to-DC converter 102 receives an AC power signal 108 from an electrical source (e.g., an electric utility). The power signal 108 has a power of at least one megawatt (MW). For instance, the power signal 108 may have a power of at least 2 MW, at least 5 MW, at least 10 MW, or at least 20 MW). In an aspect, the power signal 108 has a power in a range between 1 MW and 50 MW. In another aspect, the power signal 108 has a power in a range between 2 MW and 45 MW. In yet another aspect, the power signal 108 has a power in a range between 5 MW and 40 MW. The AC-to-DC converter 102 converts an AC voltage 110, which is included in the AC power signal 108, to an intermediate DC voltage 112. The AC voltage 110 is greater than or equal to 1000 volts root-mean-square (RMS). For instance, the AC voltage 110 may be greater than or equal to 2000 volts RMS, greater than or equal to 5000 volts RMS, or greater than or equal to 10,000 volts RMS. The intermediate DC voltage 112 is greater than or equal to 1000 volts. For instance, the intermediate DC voltage 112 may be greater than or equal to 2000 volts, greater than or equal to 5000 volts, or greater than or equal to 10,000 volts.

The AC-to-DC converter 102 may be constructed using vacuum tube diodes, wet chemical cells, mercury-arc valves, copper and selenium oxide plates, semiconductor diodes, and/or silicon-based semiconductor switches.

The solid state DC transformer 104 transforms (e.g., converts) the intermediate DC voltage 112 to a transformed DC voltage 116. The transformed DC voltage 116 is less than 1000 volts. For instance, the transformed DC voltage 116 may be less than 800 volts, less than 600 volts, or less than 400 volts. The solid state DC transformer 104 provides a DC power signal 114, which includes the transformed DC voltage 116, to information technology (IT) hardware.

The disaggregated solid state power distribution system 100 is shown to include a cable 106, which provides (e.g., transfers) the intermediate DC voltage 112 from the AC-to-DC converter 102 to the solid state DC transformer 104, though the example embodiments are not limited in this respect. The cable 106 may have any suitable length. For instance, the cable 106 may have a length of at least five feet, at least 20 feet, at least 100 feet, at least 200 feet, or at least 500 feet. In an aspect, the cable 106 is a single cable. In another aspect, the cable 106 includes multiple cables (e.g., connected in parallel between the AC-to-DC converter 102 and the solid state DC transformer 104). In accordance with this aspect, the cable 106 may include at least five cables, at least 10 cables, or at least 20 cables.

Figure 2:
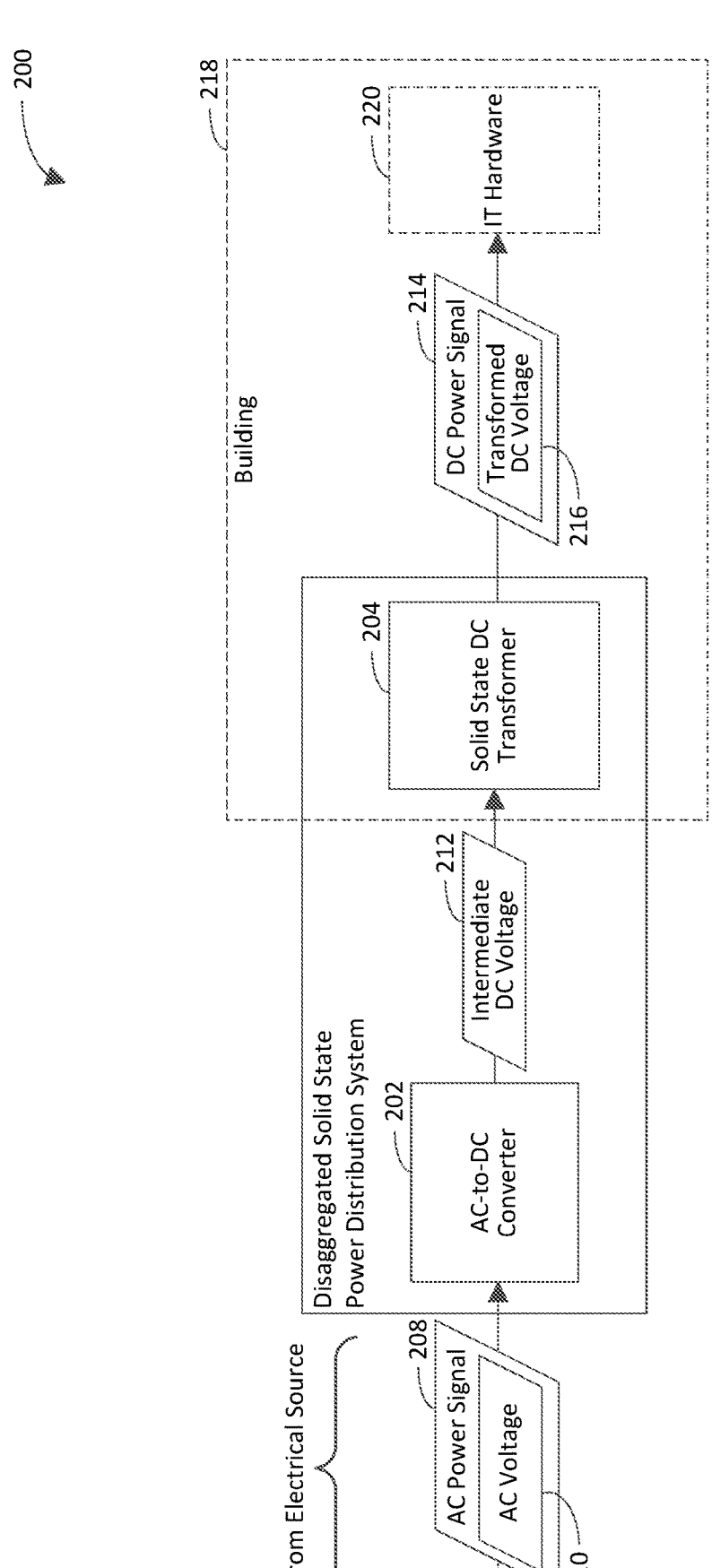
FIGS. 2-8 are block diagrams of example implementations of a disaggregated solid state power distribution system shown in FIG. 1 in accordance with embodiments.

FIGS. 2-8 are block diagrams of disaggregated solid state power distribution systems 200, 300, 400, 500, 600, 700, and 800, which are example implementations of a disaggregated solid state power distribution system 100 shown in FIG. 1 in accordance with embodiments. As shown in FIG. 2, the disaggregated solid state power distribution system 200 includes an AC-to-DC converter 202 and a solid state DC transformer 204, which are operable in a manner similar to the AC-to-DC converter 102 and the solid state DC transformer 104, respectively, shown in FIG. 1.

For example, the AC-to-DC converter 202 receives an AC power signal 208, which has a power of at least one MW, from an electrical source. The AC-to-DC converter 202 converts an AC voltage 210, which is included in the AC power signal 208, to an intermediate DC voltage 212. The AC voltage 210 is greater than or equal to 1000 volts RMS. The intermediate DC voltage 212 is greater than or equal to 1000 volts.

The solid state DC transformer 204 transforms the intermediate DC voltage 212 to a transformed DC voltage 216. The transformed DC voltage 216 is less than 1000 volts. The solid state DC transformer 204 provides a DC power signal 214, which includes the transformed DC voltage 216, to information technology (IT) hardware 220. The solid state DC transformer 204 and the IT hardware 220 are included (e.g., housed) in a building 218. In an aspect, the building 218 is an enclosed structure with a roof and walls.

The AC-to-DC converter 202 is external to the building 218. In an example embodiment, the building 218 stands on a real estate lot having an outer perimeter. In accordance with this embodiment, the AC-to-DC converter 202 is positioned (e.g., located) on the real estate lot near the outer perimeter. For instance, the AC-to-DC converter 202 may be positioned within five feet from the outer perimeter, within 10 feet from the outer perimeter, within 50 feet from the outer perimeter, or within 100 feet from the outer perimeter.

Figure 3:
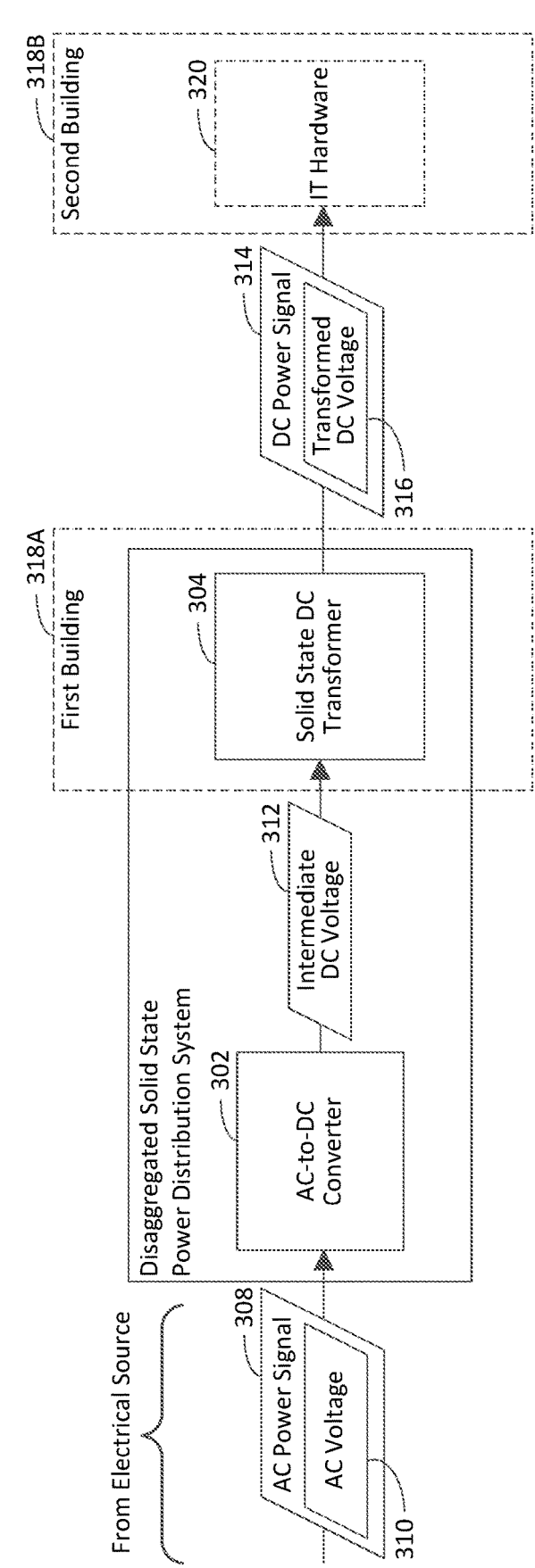

As shown in FIG. 3, the disaggregated solid state power distribution system 300 includes an AC-to-DC converter 302 and a solid state DC transformer 304, which are operable in a manner similar to the AC-to-DC converter 102 and the solid state DC transformer 104, respectively, shown in FIG. 1.

For example, the AC-to-DC converter 302 receives an AC power signal 308, which has a power of at least one MW, from an electrical source. The AC-to-DC converter 302 converts an AC voltage 310, which is included in the AC power signal 308, to an intermediate DC voltage 312. The AC voltage 310 is greater than or equal to 1000 volts RMS. The intermediate DC voltage 312 is greater than or equal to 1000 volts.

The solid state DC transformer 304 transforms the intermediate DC voltage 312 to a transformed DC voltage 316. The transformed DC voltage 316 is less than 1000 volts. The solid state DC transformer 304 provides a DC power signal 314, which includes the transformed DC voltage 316, to information technology (IT) hardware 320. The solid state DC transformer 304 is included in a first building 318A. The IT hardware 320 is included in a second building 318B. The first building 318A is external to the second building 318B. In an aspect, the first building e18A is a first enclosed structure with a roof and walls, and the second building 318B is a second enclosed structure with a roof and walls.

The AC-to-DC converter 302 is external to the first building 318A and the second building 318B. In an example embodiment, the first building 318A and the second building 318B stand on a real estate lot having an outer perimeter. In accordance with this embodiment, the AC-to-DC converter 302 is positioned on the real estate lot near the outer perimeter.

Figure 4:
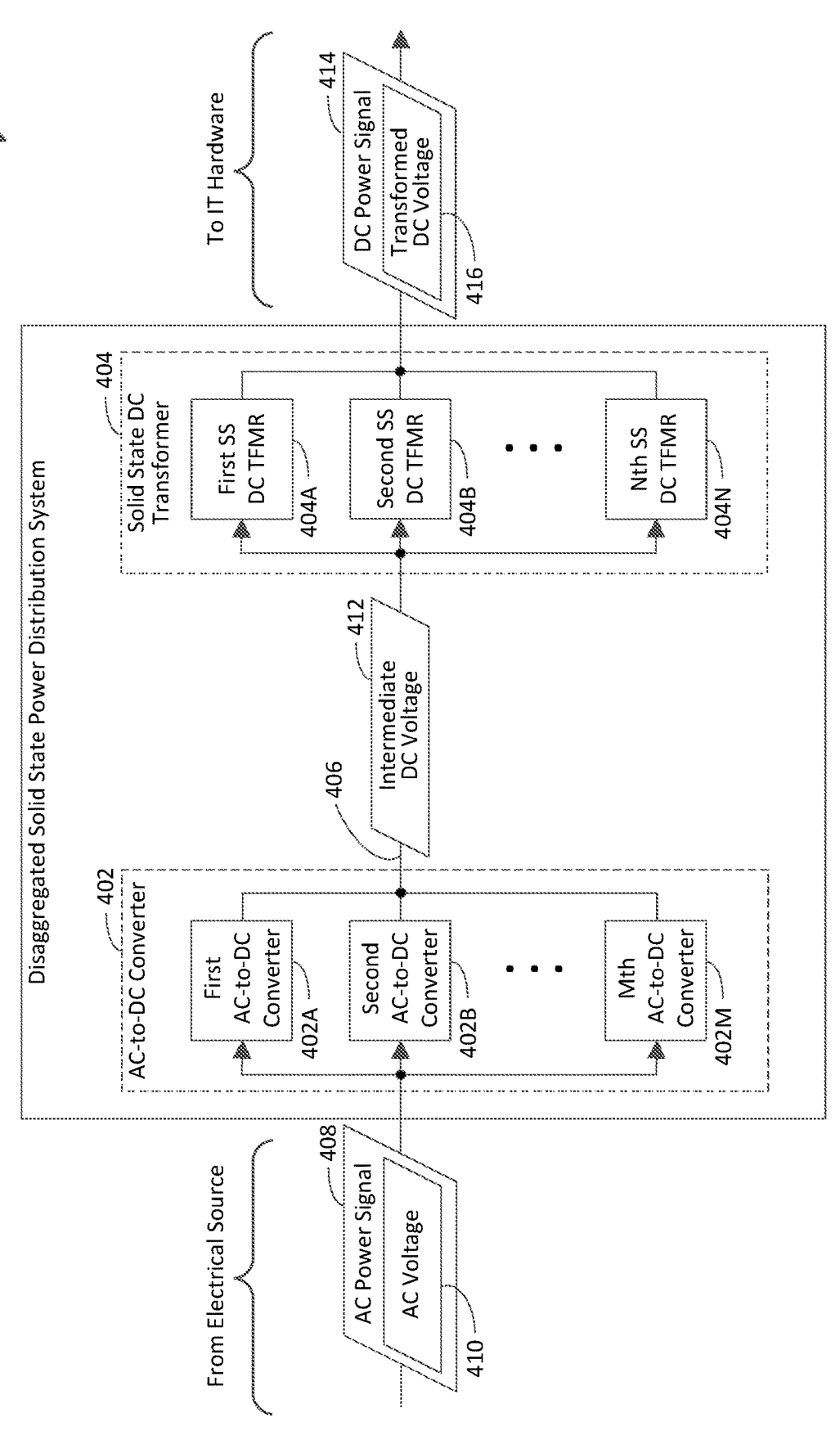

As shown in FIG. 4, the disaggregated solid state power distribution system 400 includes an AC-to-DC converter 402 and a solid state DC transformer 404, which are operable in a manner similar to the AC-to-DC converter 102 and the solid state DC transformer 104, respectively, shown in FIG. 1.

For example, the AC-to-DC converter 402 receives an AC power signal 408, which has a power of at least one MW, from an electrical source. The AC-to-DC converter 402 converts an AC voltage 410, which is included in the AC power signal 408, to an intermediate DC voltage 412. The AC voltage 410 is greater than or equal to 1000 volts RMS. The intermediate DC voltage 412 is greater than or equal to 1000 volts.

The AC-to-DC converter 402 is shown to include a plurality of AC-to-DC converters 402A-402M for illustrative purposes. The plurality of AC-to-DC converters 402A-402M are coupled in parallel between the electrical source and the solid state DC transformer 404. In an aspect, the power of the AC power signal 408 is divided (e.g., equally divided) among the AC-to-DC converters 402A-402M. In accordance with this aspect, each of the AC-to-DC converters 402A-402M may receive 1/M of the power of the AC power signal 408. For instance, each of the AC-to-DC converters 402A-402M may receive the AC voltage 410 and 1/M of the AC current that is included in the AC power signal 408.

M may be any suitable positive integer. Accordingly, the AC-to-DC converter 402 may include any suitable number (e.g., 1, 2, 3, or 5) of the AC-to-DC converters 402A-402M. The AC-to-DC converter 402 need not necessarily include the plurality of AC-to-DC converters 402A-402M. For instance, the AC-to-DC converter 402 may include (e.g., may be) a single AC-to-DC converter.

The solid state DC transformer 404 transforms the intermediate DC voltage 412 to a transformed DC voltage 416. The transformed DC voltage 416 is less than 1000 volts. The solid state DC transformer 404 provides a DC power signal 414, which includes the transformed DC voltage 416, to information technology (IT) hardware 420.

The solid state DC transformer 404 is shown to include a plurality of solid state DC transformers 404A-404N (each labeled as a "SS DC TFMR") for illustrative purposes. The plurality of solid state DC transformers 404A-404N are coupled in parallel between the AC-to-DC converter 402 and the IT hardware. Each of the solid state DC transformers 404A-404N receives the intermediate DC voltage 412 from the AC-to-DC converter 402 via a cable 406. N may be any suitable positive integer that is greater than one. Accordingly, the solid state DC transformer 404 may include any suitable number (e.g., 5, 10, 20, or 40) of the solid state DC transformers 404A-404N.

Figure 5:
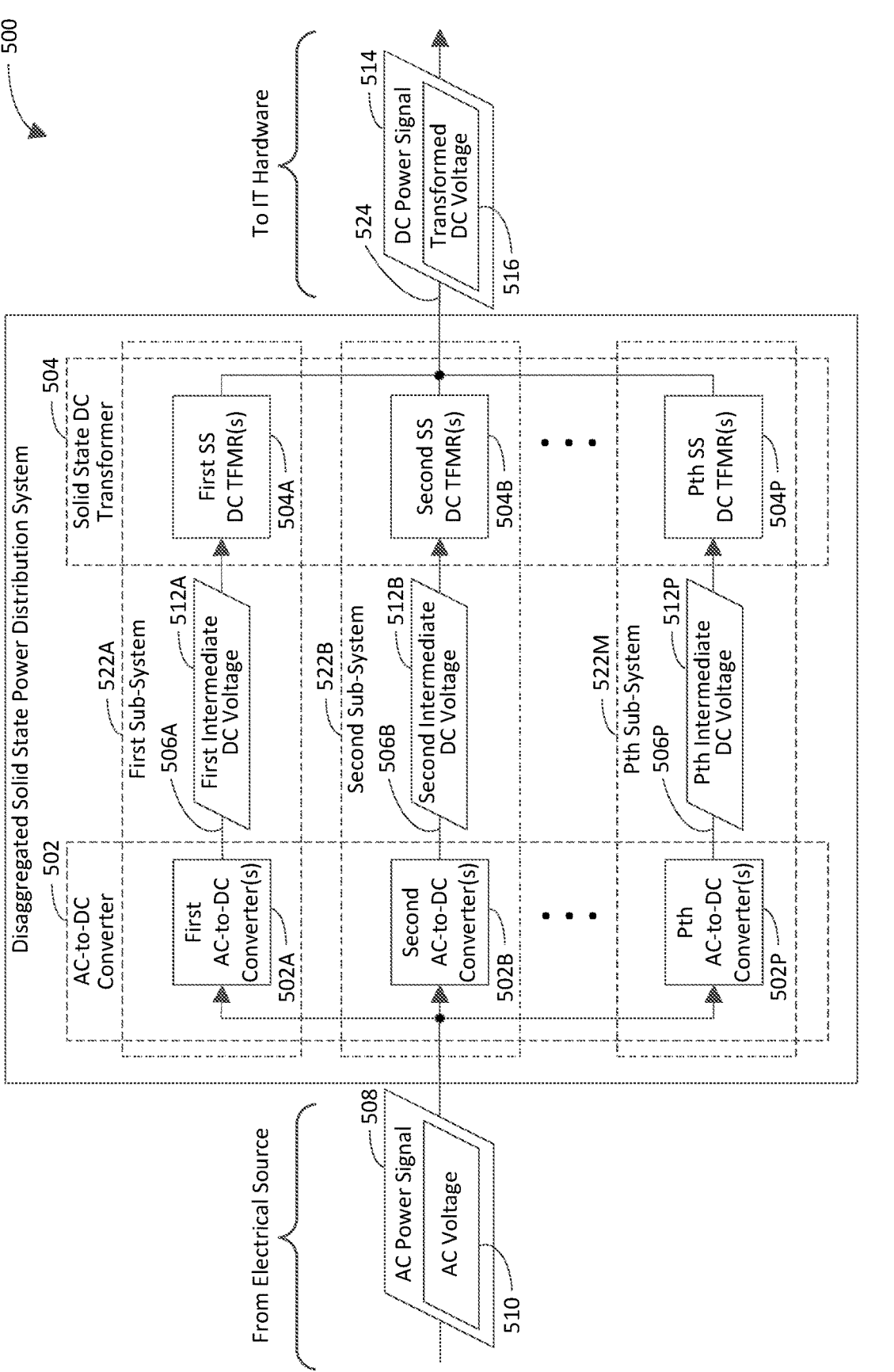

As shown in FIG. 5, the disaggregated solid state power distribution system 500 includes an AC-to-DC converter 502 and a solid state DC transformer 504. The AC-to-DC converter 502 receives an AC power signal 508, which has a power of at least one MW, from an electrical source. The AC-to-DC converter 502 includes a plurality of AC-to-DC converters 502A-502P. For example, the AC-to-DC converter 502 includes one or more first AC-to-DC converters 502A, one or more second AC-to-DC converters 502B, and so on. The power of the AC power signal 508 is divided (e.g., equally divided) among the AC-to-DC converters 502A-502P. In an aspect, each of the first AC-to-DC converter(s) 502A, the second AC-to-DC converter(s) 502B, etc. receives 1/P of the power of the AC power signal 508. For instance, each of the first AC-to-DC converter(s) 502A, the second AC-to-DC converter(s) 502B, etc. may receive the AC voltage 510 and 1/P of the AC current that is included in the AC power signal 508. The plurality of AC-to-DC converters 502A-502P convert the AC voltage 510, which is included in the AC power signal 508, to a plurality of respective intermediate DC voltages 512A-512P. The AC voltage 510 is greater than or equal to 1000 volts RMS. Each of the intermediate DC voltages 512A-512P is greater than or equal to 1000 volts. P may be any suitable positive integer that is greater than one. Accordingly, the AC-to-DC converter 502 may include any suitable number (e.g., 1, 2, 3, or 5) of the AC-to-DC converters 502A-502P.

The solid state DC transformer 504 includes a plurality of solid state DC transformers 504A-504P. For example, the solid state DC transformer 504 includes one or more first solid state DC transformers (labeled "first SS DC TFMR(s)") 504A, one or more second solid state DC transformers (labeled "second SS DC TFMR(s)") 504B, and so on. The plurality of solid state DC transformers 504A-504P transform the plurality of respective intermediate DC voltages 512A-512P, which are received from the plurality of respective AC-to-DC converters 502A-502P via a plurality of respective cables 506A-506P, to a transformed DC voltage 516. The transformed DC voltage 516 is less than 1000 volts. The plurality of solid state DC transformers 504A-504P collaboratively provide a DC power signal 514, which includes the transformed DC voltage 516, to information technology (IT) hardware. For instance, each of the solid state DC transformers 504A-504P provides a respective portion of the DC power signal 514. In an aspect, the solid state DC transformers 504A-504P provide respective currents, which are summed to provide a summed current. The DC power signal 514 may be equal to a product of the transformed DC voltage 516 and the summed current.

The plurality of solid state DC transformers 504A-504P are shown to collaboratively provide a DC power signal 514 to the IT hardware via a common (e.g., same) bus bar 524 for illustrative purposes. A bus bar is a metallic strip or bar that is capable of transmitting power. The bus bar may be housed in switchgear, a panel board, or a busway enclosure. It will be recognized that the plurality of solid state DC transformers 504A-504P may collaboratively provide the DC power signal 514 to the IT hardware via any suitable number of bus bars. In an aspect, the plurality of solid state DC transformers 504A-504P collaboratively provide the DC power signal 514 to the IT hardware via a plurality of respective bus bars. In accordance with this aspect, the first solid state DC transformer(s) 504A provide a first portion of the DC power signal 514 to the IT hardware via a first bus bar; the second solid state DC transformer(s) 504B provide a second portion of the DC power signal 514 to the IT hardware via a second bus bar, and so on.

The disaggregated solid state power distribution system 500 includes a plurality of sub-systems 522A-522P. For example, a first sub-system 522A includes the first AC-to-DC converter(s) 502A and the first solid state DC transformer(s) 504A. A second sub-system 522B includes the second AC-to-DC converter(s) 502B and the second solid state DC transformer(s) 504B, and on. The plurality of sub-systems 522A-522P are coupled in parallel between the electrical source and the IT hardware.

Figure 6:
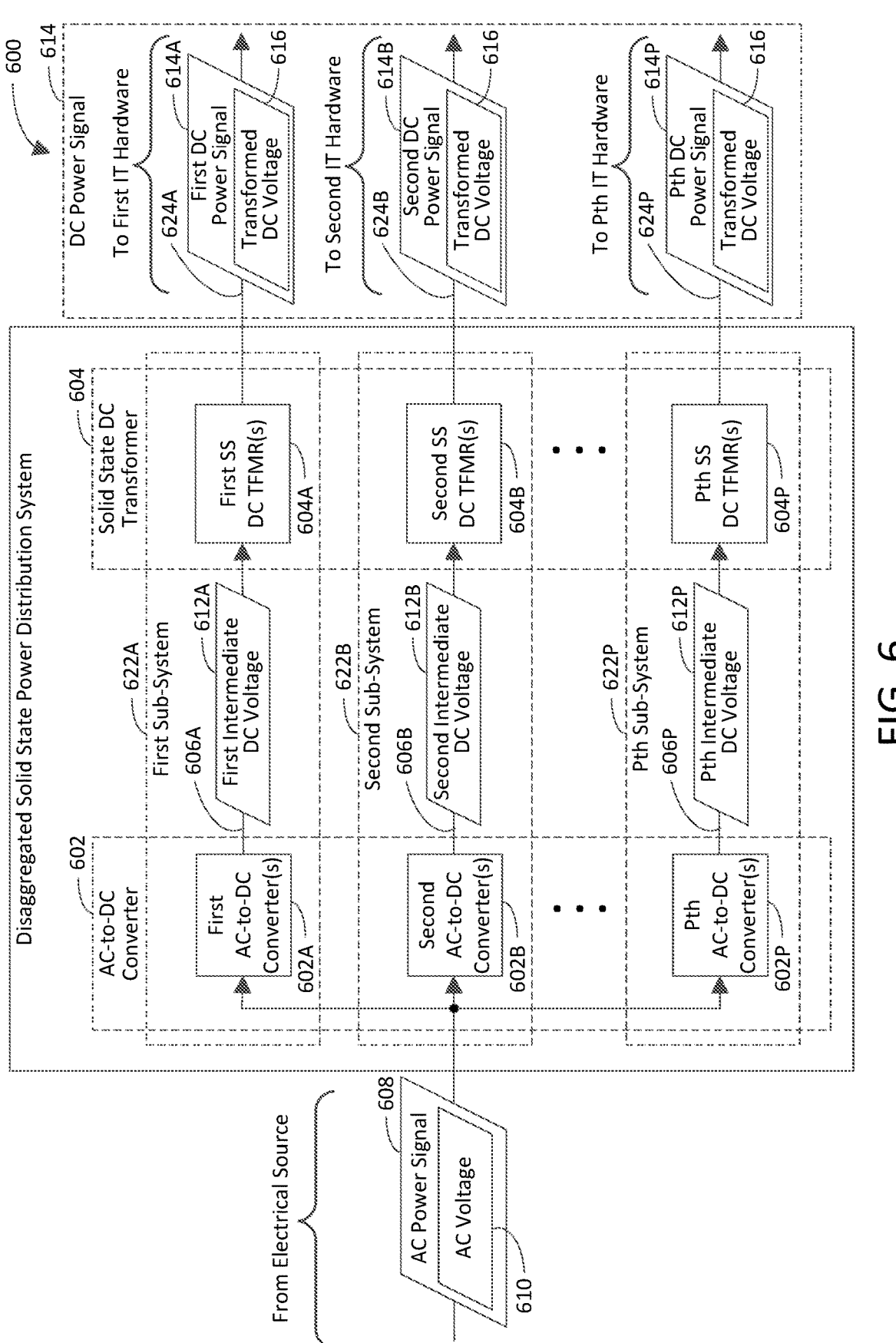

As shown in FIG. 6, the disaggregated solid state power distribution system 600 includes an AC-to-DC converter 602 and a solid state DC transformer 604. The AC-to-DC converter 602 receives an AC power signal 608, which has a power of at least one MW, from an electrical source. The AC-to-DC converter 602 includes a plurality of AC-to-DC converters 602A-602P. For example, the AC-to-DC converter 602 includes one or more first AC-to-DC converters 602A, one or more second AC-to-DC converters 602B, and so on. The plurality of AC-to-DC converters 602A-602P convert an AC voltage 610, which is included in an AC power signal 608, to a plurality of respective intermediate DC voltages 612A-612P. The AC voltage 610 is greater than or equal to 1000 volts RMS. Each of the intermediate DC voltages 612A-612P is greater than or equal to 1000 volts. P may be any suitable positive integer that is greater than one.

The solid state DC transformer 604 includes a plurality of solid state DC transformers 604A-604P. For example, the solid state DC transformer 604 includes one or more first solid state DC transformers (labeled "first SS DC TFMR(s)") 604A, one or more second solid state DC transformers (labeled "second SS DC TFMR(s)") 604B, and so on. The plurality of solid state DC transformers 604A-604P transform the plurality of respective intermediate DC voltages 612A-612P, which are received from the plurality of respective AC-to-DC converters 602A-602P via a plurality of respective cables 606A-606P, to a transformed DC voltage 616. The transformed DC voltage 616 is less than 1000 volts. The plurality of solid state DC transformers 604A-604P provide a plurality of respective DC power signals 614A-614P, which include the transformed DC voltage 616, to a plurality of respective information technology (IT)

hardware systems via a plurality of respective bus bars 624A-624P. For example, a first solid state DC transformer 604A provides a first DC power signal 614A to first IT hardware (a.k.a. a first IT hardware system) via a first bus bar 624A. A second solid state DC transformer 604B provides a second DC power signal 614B to second IT hardware (a.k.a. a second IT hardware system) via a second bus bar 624B, and so on. In an aspect, each of the IT hardware systems is distinct from the other IT hardware systems. In another aspect, the IT hardware systems are mutually exclusive (e.g., do not include components of the other IT hardware systems). In yet another aspect, the first IT hardware includes a first plurality of servers; the second IT hardware includes a second plurality of servers, and so on.

In an example embodiment, the plurality of solid state DC transformers 604A-604P are included in a plurality of respective enclosures. In another example embodiment, the plurality of solid state DC transformers 604A-604P are included in a common (e.g., same) enclosure.

The disaggregated solid state power distribution system 600 includes a plurality of sub-systems 622A-622P. For example, a first sub-system 622A includes the first AC-to-DC converter(s) 602A and the first solid state DC transformer(s) 604A. A second sub-system 622B includes the second AC-to-DC converter(s) 602B and the second solid state DC transformer(s) 604B, and on.

Figure 7:
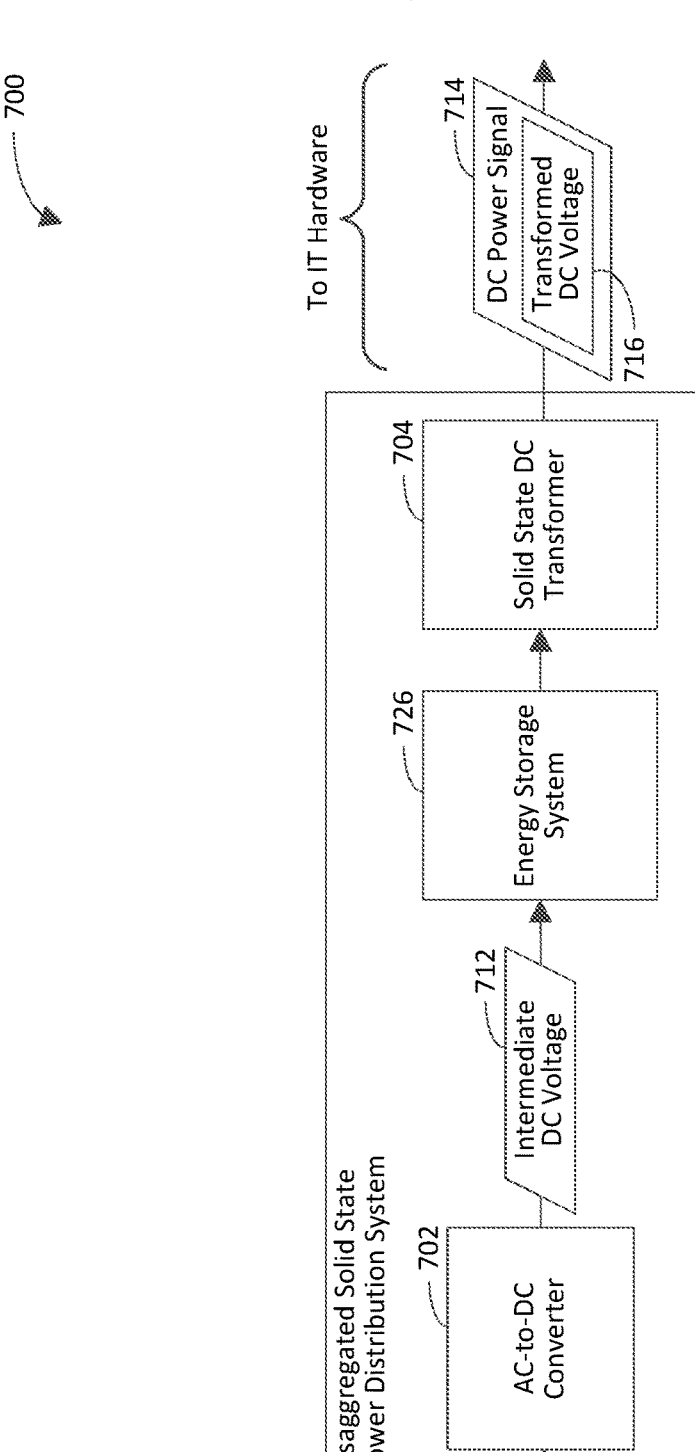

As shown in FIG. 7, the disaggregated solid state power distribution system 700 includes an AC-to-DC converter 702, a solid state DC transformer 704, and an energy storage system 726. The AC-to-DC converter 702 receives an AC power signal 708, which has a power of at least one MW, from an electrical source. The AC-to-DC converter 702 converts an AC voltage 710, which is included in the AC power signal 708, to an intermediate DC voltage 712. The AC voltage 710 is greater than or equal to 1000 volts RMS. The intermediate DC voltage 712 is greater than or equal to 1000 volts.

The solid state DC transformer 704 transforms the intermediate DC voltage 712 to a transformed DC voltage 716. The transformed DC voltage 716 is less than 1000 volts. The solid state DC transformer 704 provides a DC power signal 714, which includes the transformed DC voltage 716, to information technology (IT) hardware.

The energy storage system 726 stores energy from the DC power signal 714 and, based at least on the amount of power that is drawn by the disaggregated solid state power distribution system 700 from the electrical source being greater than or equal to a threshold amount, provides the energy to the IT hardware. In an aspect, the energy storage system 726 is configured to store the energy from the DC power signal 714 based at least on the amount of power that is drawn by the disaggregated solid state power distribution system 700 from the electrical source being less than the threshold amount. In another aspect, by storing the energy from the DC power signal 714 and, based at least on the amount of power that is drawn by the disaggregated solid state power distribution system 700 from the electrical source being greater than or equal to the threshold amount, providing the energy to the IT hardware, a variation in an amount of power that is drawn by the disaggregated solid state power distribution system 700 from the electrical source over time is reduced. For example, by operating in this manner, the energy storage system 726 may cause the variation to be negligible. In another example, the energy storage system 726 may cause the variation to be less than 25 kW, less than 50 kW, less than 100 kW, or less than 200 kW over a designated period of time (e.g., one day, one week, one month, or one year). In yet another example, the energy storage system 726 may cause the variation to be less than 2%, less than 5%, or less than 10% of the mean of the amount of power that is drawn by the disaggregated solid state power distribution system 700 from the electrical source over a designated period of time (e.g., one day, one week, one month, or one year).

Figure 8:
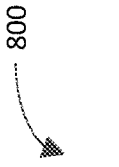
Figure 8:
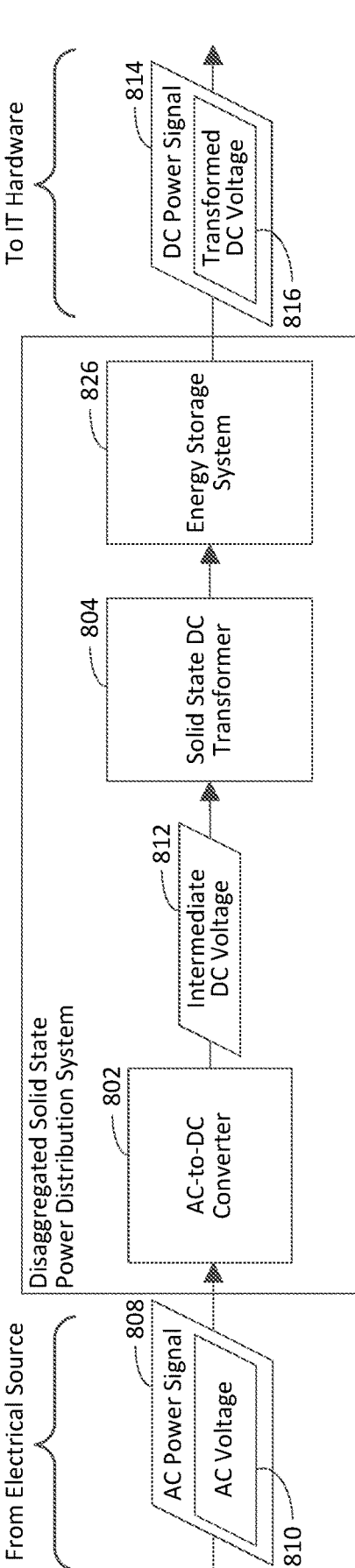

As shown in FIG. 8, the disaggregated solid state power distribution system 800 includes an AC-to-DC converter 802, a solid state DC transformer 804, and an energy storage system 826. FIG. 8 is similar to FIG. 8, except that the energy storage system 826 in FIG. 8 is coupled between the solid state DC transformer 804 and information technology (IT) hardware, whereas the energy storage system 726 in FIG. 7 is coupled between the AC-to-DC converter 702 and the solid state DC transformer 704. Accordingly, the AC-to-DC converter 802 receives an AC power signal 808, which has a power of at least one MW, from an electrical source. The AC-to-DC converter 802 converts an AC voltage 810, which is included in the AC power signal 808, to an intermediate DC voltage 812. The AC voltage 810 is greater than or equal to 1000 volts RMS. The intermediate DC voltage 812 is greater than or equal to 1000 volts.

The solid state DC transformer 804 transforms the intermediate DC voltage 712 to a transformed DC voltage 816. The transformed DC voltage 816 is less than 1000 volts. The solid state DC transformer 804 provides a DC power signal 814, which includes the transformed DC voltage 816, to the IT hardware.

The energy storage system 826 stores energy from the DC power signal 814 and, based at least on the amount of power that is drawn by the disaggregated solid state power distribution system 800 from the electrical source being greater than or equal to a threshold amount, provides the energy to the IT hardware.

FIG. 9 depicts a flowchart 900 of an example method for distributing power using a disaggregated solid state power distribution system in accordance with an embodiment. Flowchart 900 may be performed by the disaggregated solid state power distribution system 100 shown in FIG. 1 (and/or any of the example implementations thereof shown in FIGS. 2-8), for example. For illustrative purposes, flowchart 900 is described with respect to the disaggregated solid state power distribution system 100 shown in FIG. 1 and the example implementations thereof shown in FIGS. 2-8.

As shown in FIG. 9, the method of flowchart 900 begins at step 902. In step 902, an alternating-current (AC) voltage, which is included in an incoming AC power signal having a power of at least one megawatt from an electrical source, is converted by an alternating-current-to-direct-current (AC-to-DC) converter to an intermediate direct-current (DC) voltage. The AC voltage is greater than or equal to 1000 volts root-mean-square (RMS). The intermediate DC voltage is greater than or equal to 1000 volts. In an example implementation, the AC-to-DC converter 102 converts the AC voltage (e.g., AC voltage 110) to the intermediate DC voltage (e.g., intermediate DC voltage 112).

In an example embodiment, converting the AC voltage to the intermediate DC voltage at step 902 is performed by a plurality of AC-to-DC converters (e.g., AC-to-DC converters 402A-402M, 502A-502P, or 602A-602M in FIG. 4, 5, or 6, respectively) that are connected in parallel between the electrical source and the solid state DC transformer (e.g., solid state DC transformer 104, 204, 304, 404, 504, 604, 704, or 804 in FIG. 1, 2, 3, 4, 5, 6, 7, or 8, respectively).

At step 904, a DC power signal is provided by a solid state DC transformer to information technology (IT) hardware by transforming the intermediate DC voltage to a transformed DC voltage that is included in the DC power signal. The transformed DC voltage is less than 1000 volts. In an example implementation, the solid state DC transformer 104 provides the DC power signal (e.g., DC power signal 114) to the IT hardware by transforming the intermediate DC voltage (e.g., intermediate DC voltage 112) to the transformed DC voltage (e.g., transformed DC voltage 116).

In an example embodiment, the AC voltage (e.g., AC voltage 210 or 310 in FIG. 2 or 3, respectively) is converted to the intermediate DC voltage (e.g., intermediate DC voltage 212 or 312 in FIG. 2 or 3, respectively) at step 902 by the AC-to-DC converter (e.g., AC-to-DC converter 202 or 302 in FIG. 2 or 3, respectively), which is external to a building (e.g., building 218 in FIG. 2 or first building 318A in FIG. 3) that includes the solid state DC transformer (e.g., solid state DC transformer 204 or 304 in FIG. 2 or 3, respectively).

In a first aspect of this embodiment, the solid state DC transformer (e.g., solid state DC transformer 204 in FIG. 2) is included in the building (e.g., building 218 in FIG. 2) that includes the IT hardware (e.g., IT hardware 220 in FIG. 2).

In a second aspect of this embodiment, the solid state DC transformer (e.g., solid state DC transformer 304 in FIG. 3) is included in the building (e.g., first building 318A in FIG. 3) that is external to a second building (e.g., second building 318B in FIG. 3) that includes the IT hardware (e.g., IT hardware 320 in FIG. 3).

In another example embodiment, providing the DC power signal (e.g., DC power signal 414, 514, or 614 in FIG. 4, 5, or 6, respectively) to the IT hardware at step 904 is performed by a plurality of solid state DC transformers (e.g., solid state DC transformers 404A-404N, 504A-504P, or 604A-604P in FIG. 4, 5, or 6, respectively) that are connected in parallel between the AC-to-DC converter (e.g., AC-to-DC converter 402, 502, or 602 in FIG. 4, 5, or 6, respectively) and the IT hardware.

In a first aspect of this embodiment, providing the DC power signal to the IT hardware at step 904 includes providing a plurality of respective portions (e.g., DC power signals 614A-614P in FIG. 6) of the DC power signal (e.g., DC power signal 614 in FIG. 6) to respective pluralities of servers in the IT hardware by the plurality of solid state DC transformers (e.g., solid state DC transformers 604A-604P).

In a second aspect of this embodiment, the method of flowchart 900 further includes converting, by a second AC-to-DC converter (e.g., second AC-to-DC converter(s) 602B in FIG. 6), the AC voltage (e.g., AC voltage 610 in FIG. 6), which is included in the incoming AC power signal (e.g., AC power signal in FIG. 6) from the electrical source, to a second intermediate DC voltage (e.g., second intermediate DC voltage 612B). For instance, the AC voltage may be converted to the intermediate DC voltage at step 902 by the first AC-to-DC converter(s) 602A in FIG. 6. In accordance with the second aspect, the method of flowchart 900 further includes providing, by a second plurality of solid state DC transformers (e.g., second solid state DC transformer(s) 604B) that are connected in parallel between the second AC-to-DC converter and the IT hardware, a second DC power signal (e.g., second DC power signal 614B) to the IT hardware by transforming the second intermediate DC voltage to the transformed DC voltage that is included in the second DC power signal. For instance, the DC power signal may be provided to the IT hardware at step 904 by the first solid state DC transformer(s) 604A in FIG. 6.

In an example of the second aspect, the DC power signal is provided to the IT hardware by the plurality of solid state DC transformers and the second DC power signal is provided to the IT hardware by the second plurality of solid state DC transformers through a common bus bar.

In another example of the second aspect, the DC power signal is provided to the IT hardware by the plurality of solid state DC transformers through a first bus bar, and the second DC power signal is provided to the IT hardware by the second plurality of solid state DC transformers through a second bus bar that is different from the first bus bar.

In some example embodiments, one or more steps 902 and/or 904 of flowchart 900 are not performed. Moreover, steps in addition to or in lieu of steps 902 and/or 904 may be performed. For instance, in an example embodiment, the method of flowchart 900 further includes providing the intermediate DC voltage from the AC-to-DC converter to the solid state DC transformer via a cable that has a length of at least five feet. In an example implementation, the AC-to-DC converter 102 provides the intermediate DC voltage 112 to the solid state DC transformer 104 via the cable 106 having the length of at least five feet.

In another example embodiment, the method of flowchart 900 further includes reducing a variation in an amount of power that is drawn by the disaggregated solid state power distribution system from the electrical source over time by storing energy from the DC power signal in an energy storage system that is coupled between the AC-to-DC converter and the solid state DC transformer and further by providing the energy to the IT hardware based at least on the amount of power that is drawn by the disaggregated solid state power distribution system from the electrical source being greater than or equal to a threshold amount. In an example implementation, the energy storage system 726 in FIG. 7, which is coupled between the AC-to-DC converter 702 and the solid state DC transformer 704, reduces a variation in an amount of power that is drawn by the disaggregated solid state power distribution system 700 from the electrical source over time by storing energy from the DC power signal 708 and further by providing the energy to the IT hardware based at least on the amount of power that is drawn by the disaggregated solid state power distribution system 700 from the electrical source being greater than or equal to the threshold amount.

In yet another example embodiment, the method of flowchart 900 further includes reducing a variation in an amount of power that is drawn by the disaggregated solid state power distribution system from the electrical source over time by storing energy from the DC power signal in an energy storage system coupled between the solid state DC transformer and the IT hardware and further by providing the energy to the IT hardware based at least on the amount of power that is drawn by the disaggregated solid state power distribution system from the electrical source being greater than or equal to a threshold amount. In an example implementation, the energy storage system 826 in FIG. 8, which is coupled between the solid state DC transformer 804 and the IT hardware, reduces a variation in an amount of power that is drawn by the disaggregated solid state power distribution system 800 from the electrical source over time by storing energy from the DC power signal 808 and further by providing the energy to the IT hardware based at least on the amount of power that is drawn by the disaggregated solid state power distribution system 800 from the electrical source being greater than or equal to a threshold amount.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

II. Further Discussion of Some Example Embodiments (A1) A first example disaggregated solid state power distribution system (FIG. 1, 100; FIG. 2, 200; FIG. 3, 300; FIG. 4, 400; FIG. 5, 500; FIG. 6, 600; FIG. 7, 700; FIG. 8, 800) comprises an alternating-current-to-direct-current converter (FIG. 1, 102; FIG. 2, 202; FIG. 3, 302; FIG. 4, 402; FIG. 5, 502; FIG. 6, 602; FIG. 7, 702; FIG. 8, 802) and a solid state direct-current transformer (FIG. 1, 104; FIG. 2, 204; FIG. 3, 304; FIG. 4, 404; FIG. 5, 504; FIG. 6, 604; FIG. 7, 704; FIG. 8, 804). The alternating-current-to-direct-current converter converts (FIG. 9, 902) an alternating-current voltage (FIG. 1, 110; FIG. 2, 210; FIG. 3, 310; FIG. 4, 410; FIG. 5, 510; FIG. 6, 610; FIG. 7, 710; FIG. 8, 810), which is included in an incoming alternating-current power signal (FIG. 1, 108; FIG. 2, 208; FIG. 3, 308; FIG. 4, 408; FIG. 5, 508; FIG. 6, 608; FIG. 7, 708; FIG. 8, 808) having a power of at least one megawatt from an electrical source, to an intermediate direct-current voltage (FIG. 1, 112; FIG. 2, 212; FIG. 3, 312; FIG. 4, 412; FIG. 5, 512A-512P; FIG. 6, 612A-612P; FIG. 7, 712; FIG. 8, 812). The alternating-current voltage is greater than or equal to 1000 volts root-mean-square. The intermediate direct-current voltage is greater than or equal to 1000 volts. The solid state direct-current transformer provides (FIG. 9, 904) a direct-current power signal (FIG. 1, 114; FIG. 2, 214; FIG. 3, 314; FIG. 4, 414; FIG. 5, 514; FIG. 6, 614; FIG. 7, 714; FIG. 8, 814) to information technology hardware (FIG. 2, 220; FIG. 3, 320) by transforming the intermediate direct-current voltage to a transformed direct-current voltage (FIG. 1, 116; FIG. 2, 216; FIG. 3, 316; FIG. 4, 416; FIG. 5, 516; FIG. 6, 616; FIG. 7, 716; FIG. 8, 816) that is included in the direct-current power signal. The transformed direct-current voltage is less than 1000 volts.

(A2) In the first example disaggregated solid state power distribution system of A1, further comprising: a cable that provides the intermediate direct-current voltage from the alternating-current-to-direct-current converter to the solid state direct-current transformer; wherein the cable has a length of at least five feet.

(A3) In the first example disaggregated solid state power distribution system of any of A1-A2, wherein the alternating-current-to-direct-current converter is external to a building that includes the solid state direct-current transformer.

(A4) In the first example disaggregated solid state power distribution system of any of A1-A3, wherein solid state direct-current transformer is included in the building, which includes the information technology hardware.

(A5) In the first example disaggregated solid state power distribution system of any of A1-A4, wherein solid state direct-current transformer is included in the building, which is external to a second building that includes the information technology hardware.

(A6) In the first example disaggregated solid state power distribution system of any of A1-A5, wherein the alternating-current-to-direct-current converter comprises a plurality of alternating-current-to-direct-current converters that are connected in parallel between the electrical source and the solid state direct-current transformer.

(A7) In the first example disaggregated solid state power distribution system of any of A1-A6, wherein the solid state direct-current transformer comprises a plurality of solid state direct-current transformers that are connected in parallel between the alternating-current-to-direct-current converter and the information technology hardware.

(A8) In the first example disaggregated solid state power distribution system of any of A1-A7, wherein the plurality of solid state direct-current transformers are coupled to respective pluralities of servers in the information technology hardware.

(A9) In the first example disaggregated solid state power distribution system of any of A1-A8, further comprising: a second alternating-current-to-direct-current converter that converts the alternating-current voltage, which is included in the incoming alternating-current power signal from the electrical source, to a second intermediate direct-current voltage; and a second plurality of solid state direct-current transformers that provides a second direct-current power signal to the information technology hardware by transforming the second intermediate direct-current voltage to the transformed direct-current voltage that is included in the second direct-current power signal, the second plurality of solid state direct-current transformers connected in parallel between the second alternating-current-to-direct-current converter and the information technology hardware.

(A10) In the first example disaggregated solid state power distribution system of any of A1-A9, wherein the plurality of solid state direct-current transformers and the second plurality of solid state direct-current transformers are connected to the information technology hardware through a common bus bar.

(A11) In the first example disaggregated solid state power distribution system of any of A1-A10, wherein the plurality of solid state direct-current transformers is connected to the information technology hardware through a first bus bar; and wherein the second plurality of solid state direct-current transformers is connected to the information technology hardware through a second bus bar that is different from the first bus bar.

(A12) In the first example disaggregated solid state power distribution system of any of A1-A11, further comprising: an energy storage system coupled between the alternating-current-to-direct-current converter and the solid state direct-current transformer; wherein the energy storage system reduces a variation in an amount of power that is drawn by the disaggregated solid state power distribution system from the electrical source over time by storing energy from the direct-current power signal and further by providing the energy to the information technology hardware based at least on the amount of power that is drawn by the disaggregated solid state power distribution system from the electrical source being greater than or equal to a threshold amount.

(A13) In the first example disaggregated solid state power distribution system of any of A1-A12, further comprising: an energy storage system coupled between the solid state direct-current transformer and the information technology hardware; wherein the energy storage system reduces a variation in an amount of power that is drawn by the disaggregated solid state power distribution system from the electrical source over time by storing energy from the direct-current power signal and further by providing the energy to the information technology hardware based at least on the amount of power that is drawn by the disaggregated solid state power distribution system from the electrical source being greater than or equal to a threshold amount.

(B1) A second example disaggregated solid state power distribution system (FIG. 1, 100; FIG. 2, 200; FIG. 3, 300; FIG. 4, 400; FIG. 5, 500; FIG. 6, 600; FIG. 7, 700; FIG. 8, 800) comprises means (FIG. 1, 102; FIG. 2, 202; FIG. 3, 302; FIG. 4, 402; FIG. 5, 502; FIG. 6, 602; FIG. 7, 702; FIG. 8, 802) for converting (FIG. 9, 902) an alternating-current voltage (FIG. 1, 110; FIG. 2, 210; FIG. 3, 310; FIG. 4, 410; FIG. 5, 510; FIG. 6, 610; FIG. 7, 710; FIG. 8, 810), which is included in an incoming alternating-current power signal (FIG. 1, 108; FIG. 2, 208; FIG. 3, 308; FIG. 4, 408; FIG. 5, 508; FIG. 6, 608; FIG. 7, 708; FIG. 8, 808) having a power of at least one megawatt from an electrical source, to an intermediate direct-current voltage (FIG. 1, 112; FIG. 2, 212; FIG. 3, 312; FIG. 4, 412; FIG. 5, 512A-512P; FIG. 6, 612A-612P; FIG. 7, 712; FIG. 8, 812). The alternating-current voltage is greater than or equal to 1000 volts root-mean-square. The intermediate direct-current voltage is greater than or equal to 1000 volts. The second example disaggregated solid state power distribution system further comprises means (FIG. 1, 104; FIG. 2, 204; FIG. 3, 304; FIG. 4, 404; FIG. 5, 504; FIG. 6, 604; FIG. 7, 704; FIG. 8, 804) for providing (FIG. 9, 904) a direct-current power signal (FIG. 1, 114; FIG. 2, 214; FIG. 3, 314; FIG. 4, 414; FIG. 5, 514; FIG. 6, 614; FIG. 7, 714; FIG. 8, 814) to information technology hardware (FIG. 2, 220; FIG. 3, 320) by transforming the intermediate direct-current voltage to a transformed direct-current voltage (FIG. 1, 116; FIG. 2, 216; FIG. 3, 316; FIG. 4, 416; FIG. 5, 516; FIG. 6, 616; FIG. 7, 716; FIG. 8, 816) that is included in the direct-current power signal. The transformed direct-current voltage is less than 1000 volts.

(C1) An example method is performed by a disaggregated solid state power distribution system (FIG. 1, 100; FIG. 2, 200; FIG. 3, 300; FIG. 4, 400; FIG. 5, 500; FIG. 6, 600; FIG. 7, 700; FIG. 8, 800). The method comprises converting (FIG. 9, 902), by an alternating-current-to-direct-current converter (FIG. 1, 102; FIG. 2, 202; FIG. 3, 302; FIG. 4, 402; FIG. 5, 502; FIG. 6, 602; FIG. 7, 702; FIG. 8, 802), an alternating-current voltage (FIG. 1, 110; FIG. 2, 210; FIG. 3, 310; FIG. 4, 410; FIG. 5, 510; FIG. 6, 610; FIG. 7, 710; FIG. 8, 810), which is included in an incoming alternating-current power signal (FIG. 1, 108; FIG. 2, 208; FIG. 3, 308; FIG. 4, 408; FIG. 5, 508; FIG. 6, 608; FIG. 7, 708; FIG. 8, 808) having a power of at least one megawatt from an electrical source, to an intermediate direct-current voltage (FIG. 1, 112; FIG. 2, 212; FIG. 3, 312; FIG. 4, 412; FIG. 5, 512A-512P; FIG. 6, 612A-612P; FIG. 7, 712; FIG. 8, 812). The alternating-current voltage is greater than or equal to 1000 volts root-mean-square. The intermediate direct-current voltage is greater than or equal to 1000 volts. The method further comprises providing (FIG. 9, 904), by a solid state direct-current transformer (FIG. 1, 104; FIG. 2, 204; FIG. 3, 304; FIG. 4, 404; FIG. 5, 504; FIG. 6, 604; FIG. 7, 704; FIG. 8, 804), a direct-current power signal (FIG. 1, 114; FIG. 2, 214; FIG. 3, 314; FIG. 4, 414; FIG. 5, 514; FIG. 6, 614; FIG. 7, 714; FIG. 8, 814) to information technology hardware (FIG. 2, 220; FIG. 3, 320) by transforming the intermediate direct-current voltage to a transformed direct-current voltage (FIG. 1, 116; FIG. 2, 216; FIG. 3, 316; FIG. 4, 416; FIG. 5, 516; FIG. 6, 616; FIG. 7, 716; FIG. 8, 816) that is included in the direct-current power signal. The transformed direct-current voltage is less than 1000 volts.

(C2) In the example method of C1, further comprising: providing the intermediate direct-current voltage from the alternating-current-to-direct-current converter to the solid state direct-current transformer via a cable that has a length of at least five feet.

(C3) In the example method of any of C1-C2, wherein the alternating-current voltage is converted to the intermediate direct-current voltage by the alternating-current-to-direct-current converter, which is external to a building that includes the solid state direct-current transformer.

(C4) In the example method of any of C1-C3, wherein the direct-current power signal is provided to the information technology hardware by the solid state direct-current transformer, which is included in the building that includes the information technology hardware.

(C5) In the example method of any of C1-C4, wherein the direct-current power signal is provided to the information technology hardware by the solid state direct-current transformer, which is included in the building that is external to a second building that includes the information technology hardware.

(C6) In the example method of any of C1-C5, wherein converting the alternating-current voltage to the intermediate direct-current voltage comprises: converting the alternating-current voltage to the intermediate direct-current voltage by a plurality of alternating-current-to-direct-current converters that are connected in parallel between the electrical source and the solid state direct-current transformer.

(C7) In the example method of any of C1-C6, wherein providing the direct-current power signal to the information technology hardware comprises: providing the direct-current power signal to the information technology hardware by a plurality of solid state direct-current transformers that are connected in parallel between the alternating-current-to-direct-current converter and the information technology hardware.

(C8) In the example method of any of C1-C7, wherein providing the direct-current power signal to the information technology hardware comprises: providing a plurality of respective portions of the direct-current power signal to respective pluralities of servers in the information technology hardware by the plurality of solid state direct-current transformers.

(C9) In the example method of any of C1-C8, further comprising: converting, by a second alternating-current-to-direct-current converter, the alternating-current voltage, which is included in the incoming alternating-current power signal from the electrical source, to a second intermediate direct-current voltage; and providing, by a second plurality of solid state direct-current transformers that are connected in parallel between the second alternating-current-to-direct-current converter and the information technology hardware, a second direct-current power signal to the information technology hardware by transforming the second intermediate direct-current voltage to the transformed direct-current voltage that is included in the second direct-current power signal.

(C10) In the example method of any of C1-C9, wherein the direct-current power signal is provided to the information technology hardware by the plurality of solid state direct-current transformers and the second direct-current power signal is provided to the information technology hardware by the second plurality of solid state direct-current transformers through a common bus bar.

(C11) In the example method of any of C1-C10, wherein the direct-current power signal is provided to the information technology hardware by the plurality of solid state direct-current transformers through a first bus bar; and wherein the second direct-current power signal is provided to the information technology hardware by the second plurality of solid state direct-current transformers through a second bus bar that is different from the first bus bar.

(C12) In the example method of any of C1-C11, further comprising: reducing a variation in an amount of power that is drawn by the disaggregated solid state power distribution system from the electrical source over time by storing energy from the direct-current power signal in an energy storage system that is coupled between the alternating-current-to-direct-current converter and the solid state direct-current transformer and further by providing the energy to the information technology hardware based at least on the amount of power that is drawn by the disaggregated solid state power distribution system from the electrical source being greater than or equal to a threshold amount.

(C13) In the example method of any of C1-C12, further comprising: reducing a variation in an amount of power that is drawn by the disaggregated solid state power distribution system from the electrical source over time by storing energy from the direct-current power signal in an energy storage system coupled between the solid state direct-current transformer and the information technology hardware and further by providing the energy to the information technology hardware based at least on the amount of power that is drawn by the disaggregated solid state power distribution system from the electrical source being greater than or equal to a threshold amount.

III. Conclusion

The foregoing detailed description refers to the accompanying drawings that illustrate example embodiments of the present disclosure. However, the scope of the present disclosure is not limited to these embodiments, but is instead defined by the appended claims. Thus, embodiments beyond those shown in the accompanying drawings, such as modified versions of the illustrated embodiments, may nevertheless be encompassed by the present disclosure.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first," "second," and "third" are used to reference some elements discussed herein. Such descriptors are used to facilitate the discussion of the example embodiments and do not indicate a required order of the referenced elements, unless an affirmative statement is made herein that such an order is required.

It will be recognized that the disclosed technologies are not limited to any particular type of hardware. Certain details of suitable hardware are well known and need not be set forth in detail in this disclosure.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A disaggregated solid state power distribution system comprising:

a first alternating-current-to-direct-current converter that converts an alternating-current voltage, which is included in an incoming alternating-current power signal having a power of at least one megawatt from an electrical source, to a first intermediate direct-current voltage, the alternating-current voltage being greater than or equal to 1000 volts root-mean-square, the first intermediate direct-current voltage being greater than or equal to 1000 volts;

a first plurality of solid state direct-current transformers that provides a first direct-current power signal to information technology hardware by transforming the first intermediate direct-current voltage to a transformed direct-current voltage that is included in the first direct-current power signal, the transformed direct-current voltage being less than 1000 volts, the first plurality of solid state direct-current transformers connected in parallel between the first alternating-current-to-direct-current converter and the information technology hardware;

a second alternating-current-to-direct-current converter that converts the alternating-current voltage, which is included in the incoming alternating-current power signal from the electrical source, to a second intermediate direct-current voltage; and a second plurality of solid state direct-current transformers that provides a second direct-current power signal to the information technology hardware by transforming the second intermediate direct-current voltage to the transformed direct-current voltage that is included in the second direct-current power signal, the second plurality of solid state direct-current transformers connected in parallel between the second alternating-current-to-direct-current converter and the information technology hardware.

2. The disaggregated solid state power distribution system of claim 1, further comprising:

a cable that provides the first intermediate direct-current voltage from the first alternating-current-to-direct-current converter to the first plurality of solid state direct-current transformers;

wherein the cable has a length of at least five feet.

3. The disaggregated solid state power distribution system of claim 1, wherein the first plurality of solid state direct-current transformers are included in a building, which includes the information technology hardware.

4. The disaggregated solid state power distribution system of claim 1, wherein the first plurality of solid state direct-current transformers are included in a first building, which is external to a second building that includes the information technology hardware.

5. The disaggregated solid state power distribution system of claim 1, wherein the first alternating-current-to-direct-current converter comprises a plurality of alternating-current-to-direct-current converters that are connected in parallel between the electrical source and the first plurality of solid state direct-current transformers.

6. The disaggregated solid state power distribution system of claim 1, wherein the first plurality of solid state direct-current transformers are coupled to respective pluralities of servers in the information technology hardware.

7. The disaggregated solid state power distribution system of claim 1, wherein the first plurality of solid state direct-current transformers and the second plurality of solid state direct-current transformers are connected to the information technology hardware through a common bus bar.

8. The disaggregated solid state power distribution system of claim 1, wherein the first plurality of solid state direct-current transformers are connected to the information technology hardware through a first bus bar; and wherein the second plurality of solid state direct-current transformers are connected to the information technology hardware through a second bus bar that is different from the first bus bar.

9. The disaggregated solid state power distribution system of claim 1, further comprising:

an energy storage system coupled between the first alternating-current-to-direct-current converter and the first plurality of solid state direct-current transformers;

wherein the energy storage system reduces a variation in an amount of power that is drawn by the disaggregated solid state power distribution system from the electrical source over time by storing energy from the first direct-current power signal and further by providing the energy to the information technology hardware based at least on the amount of power that is drawn by the disaggregated solid state power distribution system from the electrical source being greater than or equal to a threshold amount.

10. The disaggregated solid state power distribution system of claim 1, further comprising:

an energy storage system coupled between the information technology hardware and the first plurality of solid state direct-current transformers;

wherein the energy storage system reduces a variation in an amount of power that is drawn by the disaggregated solid state power distribution system from the electrical source over time by storing energy from the first direct-current power signal and further by providing the energy to the information technology hardware based at least on the amount of power that is drawn by the disaggregated solid state power distribution system from the electrical source being greater than or equal to a threshold amount.

11. A method performed by a disaggregated solid state power distribution system, the method comprising:

converting, by an alternating-current-to-direct-current converter, an alternating-current voltage, which is included in an incoming alternating-current power signal having a power of at least one megawatt from an electrical source, to an intermediate direct-current voltage, wherein the alternating-current voltage is greater than or equal to 1000 volts root-mean-square, wherein the intermediate direct-current voltage is greater than or equal to 1000 volts;

providing, by a plurality of solid state direct-current transformers that are connected in parallel between the alternating-current-to-direct-current converter and information technology hardware, a direct-current power signal to the information technology hardware by transforming the intermediate direct-current voltage to a transformed direct-current voltage that is included in the direct-current power signal, wherein the transformed direct-current voltage is less than 1000 volts;

converting, by a second alternating-current-to-direct-current converter, the alternating-current voltage, which is included in the incoming alternating-current power signal from the electrical source, to a second intermediate direct-current voltage; and providing, by a second plurality of solid state direct-current transformers that are connected in parallel between the second alternating-current-to-direct-current converter and the information technology hardware, a second direct-current power signal to the information technology hardware by transforming the second intermediate direct-current voltage to the transformed direct-current voltage that is included in the second direct-current power signal.

12. The method of claim 11, wherein the converting the alternating-current voltage to the intermediate direct-current voltage comprises:

converting the alternating-current voltage to the intermediate direct-current voltage by a plurality of alternating-current-to-direct-current converters that are connected in parallel between the electrical source and the plurality of solid state direct-current transformers.

13. The method of claim 11, further comprising:

reducing a variation in an amount of power that is drawn by the disaggregated solid state power distribution system from the electrical source over time by storing energy from the direct-current power signal in an energy storage system that is coupled between the alternating-current-to-direct-current converter and the plurality of solid state direct-current transformers and further by providing the energy to the information technology hardware based at least on the amount of power that is drawn by the disaggregated solid state power distribution system from the electrical source being greater than or equal to a threshold amount.

14. The method of claim 11, further comprising:

reducing a variation in an amount of power that is drawn by the disaggregated solid state power distribution system from the electrical source over time by storing energy from the direct-current power signal in an energy storage system coupled between the plurality of solid state direct-current transformers and the information technology hardware and further by providing the energy to the information technology hardware based at least on the amount of power that is drawn by the disaggregated solid state power distribution system from the electrical source being greater than or equal to a threshold amount.

15. A disaggregated solid state power distribution system comprising:

means for converting an alternating-current voltage, which is included in an incoming alternating-current power signal having a power of at least one megawatt from an electrical source, to an intermediate direct-current voltage, the alternating-current voltage being greater than or equal to 1000 volts root-mean-square, the intermediate direct-current voltage being greater than or equal to 1000 volts; and means for providing a direct-current power signal to information technology hardware by transforming the intermediate direct-current voltage to a transformed direct-current voltage that is included in the direct-current power signal, the transformed direct-current voltage being less than 1000 volts, wherein the means for converting the alternating-current voltage to the intermediate direct-current voltage is external to a building that includes the means for providing the direct-current power signal to the information technology hardware, and wherein the building is external to a second building that includes the information technology hardware.

16. The method of claim 11, wherein the alternating-current-to-direct-current converter is external to a building that includes the plurality of solid state direct-current transformers.

17. The method of claim 11, wherein the plurality of solid state direct-current transformers is included in a first building that is external to a second building that includes the information technology hardware.

18. The disaggregated solid state power distribution system of claim 1, wherein the first intermediate direct-current voltage is less than 30,000 volts.

19. The disaggregated solid state power distribution system of claim 15, wherein the alternating-current voltage is greater than or equal to 2000 volts root-mean-square; and wherein the intermediate direct-current voltage is greater than or equal to 2000 volts.

20. The disaggregated solid state power distribution system of claim 15, wherein the alternating-current voltage is greater than or equal to 5000 volts root-mean-square.

* * * * *